(12) United States Patent
Jonsson et al.

(10) Patent No.: US 8,477,394 B2
(45) Date of Patent: Jul. 2, 2013

(54) SYSTEMS AND METHODS FOR COLOR DEFRINGING

(75) Inventors: Ragnar H. Jonsson, Laguna Niguel, CA (US); Derek T. Walton, Bolton, MA (US); Trausti Thormundsson, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 354 days.

(21) Appl. No.: 12/851,343

(22) Filed: Aug. 5, 2010

(65) Prior Publication Data
US 2012/0033275 A1 Feb. 9, 2012

(51) Int. Cl.
  H04N 1/23 (2006.01)
  H04N 1/46 (2006.01)
  H04N 1/387 (2006.01)
  G06K 9/40 (2006.01)

(52) U.S. Cl.
  USPC ........... 358/512; 358/300; 358/530; 358/450; 382/263

(58) Field of Classification Search
  USPC ................. 358/1.1, 1.14, 1.15, 1.9, 512, 515, 358/521
  See application file for complete search history.

(56) References Cited

U.S. PATENT DOCUMENTS

| | | | |
|---|---|---|---|
| 5,182,450 A | 1/1993 | Pan | |
| 6,271,939 B1 | 8/2001 | Hu et al. | |
| 6,356,672 B1 | 3/2002 | Feng et al. | |
| 6,697,522 B1* | 2/2004 | Ishikawa | 382/167 |
| 7,072,072 B1 | 7/2006 | Balasubramanian et al. | |
| 7,321,685 B2* | 1/2008 | Okada et al. | 382/167 |
| 7,599,569 B2* | 10/2009 | Smirnov et al. | 382/260 |
| 8,036,481 B2* | 10/2011 | Sakurai et al. | 382/255 |
| 2006/0289958 A1* | 12/2006 | Sasaki | 257/440 |
| 2010/0039539 A1* | 2/2010 | Kinoshita | 348/242 |

FOREIGN PATENT DOCUMENTS

| EP | 1396817 | * 10/2004 |
|---|---|---|
| EP | 1396817 A2 | 10/2004 |

OTHER PUBLICATIONS

Rohm; Operating Method; Contact Image Sensor Heads, 6 pages, Jan. 20, 2011.
Rohm; Color Image Sensor Heads for High-Speed Scanner, Contact Image Sensor Heads, 6 pages, Jan. 20, 2011.
European Patent Office; International Search Report and Written Opinion; PCT Application No. PCT/US2011/046863; Dec. 19, 2011.
The International Bureau of WIPO; International Preliminary Report on Patentability; PCT Application No. PCT/US2011/046863; Feb. 14, 2013.

* cited by examiner

*Primary Examiner* — Akwasi M Sarpong
*Assistant Examiner* — Ibrahim Siddo
(74) *Attorney, Agent, or Firm* — Jackson Walker L.L.P.; Christopher J. Rourk

(57) ABSTRACT

A system and method for defringing chromatic aberrations that occur in imaging devices such as scanners. The system comprises shift filters to shift lines in the various color planes together. In addition in each color plane, a spread filter is used to compensate for the unequal point spread functions of each color. Furthermore, the results can be enhanced by filtering in the luminance-chrominance space.

23 Claims, 9 Drawing Sheets

SYSTEMS AND METHODS FOR COLOR DEFRINGING

BACKGROUND OF THE INVENTION

1. Field of the Invention

The present invention relates generally to defringing lateral chromatic aberrations introduced in the scanning process.

2. Related Art

In full color processes such as scanning and printing, lateral chromatic aberrations, also referred to as color fringing, can be introduced. Due to imperfections in the alignment of the scanner or printer, the color planes are not precisely aligned. For example, a typical scanner scans an image by scanning a red plane, a blue plane and a green plane. Even in modern scanners that scan in color in a single pass, the three colors can be slightly misaligned.

At present, color fringing is corrected by linear interpolation which attempts to shift the different colors in the direction of scan. However, this approach only corrects from chromatic aberration due to shift. Furthermore, the interpolation filters inherently perform some low-pass filtering, which may cause edges in the direction of scan to become slightly blurred. If the different color components have different blurring, this can introduce color fringing.

SUMMARY OF INVENTION

A system and method for defringing chromatic aberrations that occur in imaging devices such as contact image scanners is disclosed. The system comprises filters for the red, blue and green color planes, a red-green-blue (RGB) to luminance/chrominance (LC) converter that converts the filtered red, blue and green color planes into luma and chroma components, a first chroma filter, a second chroma filter and optionally a luma filter. The filters in the red, green and blue color planes apply correction to the chromatic aberration directly and the chroma filters and optionally the luma filter apply correction in the LC space. Each filter for the red, blue and green color planes can comprise a shift filter for shifting the color planes relative to each other and a spread filter for controlling the spread of each color. Each spread filter can comprise a high-pass filter, a low-pass filter or a unity filter. The optional luma filter can comprise a high-pass filter. The chroma filters can each comprise a low-pass filter. The system can further comprise an LC to RGB converter to return the image representation back to RGB.

The defringing filter can be implemented as part of the electronic logic within a flatbed scanner, sheet feed scanner, hand held scanner or multifunction peripheral. Alternatively when access to the electronic logic is not available the defringing filter can be implemented as part of the scanner driver on a personal computer or as part of a scanning application on a personal computer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure.

Image scanners typically come in one of three varieties, flatbed scanners, sheet feed scanners and handheld scanners. Embodiments of the present invention can be employed in all three types of scanners as well as others.

Figure 1:
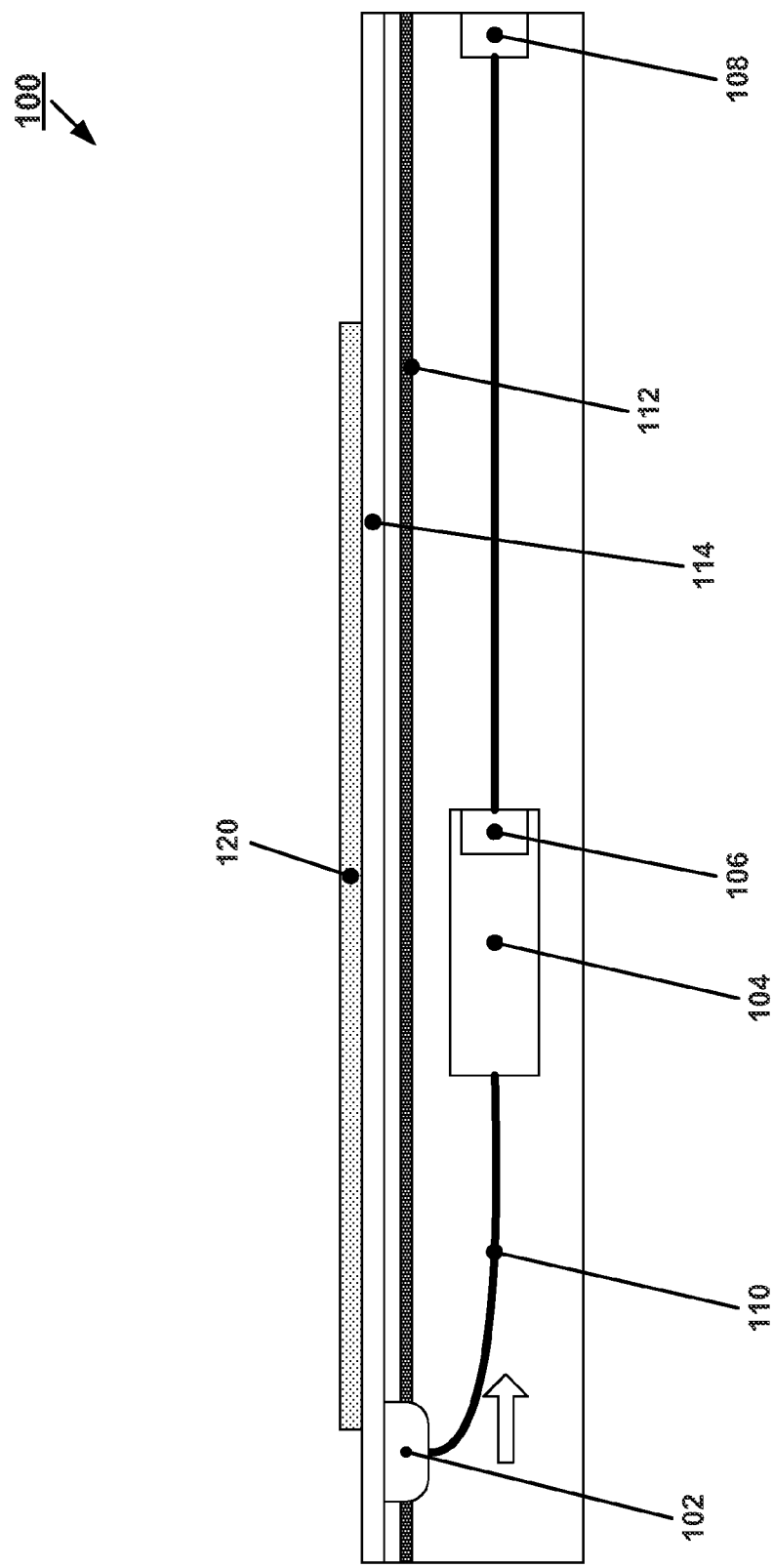
FIG. 1 shows an embodiment of a flatbed scanner.

FIG. 1 shows an embodiment of a flatbed scanner. Scanner 100 comprises scan head 102, electronic logic 104, I/O jack 108, cable 110, stabilizer bar 112, glass plate 114. Electronic logic 104 comprises I/O interface 106 for communicating with an external device which can be attached by jack 108. Example communications include a universal serial bus (USB), where I/O interface 106 is a USB driver and jack 108 is a USB jack, FireWire, where I/O interface 106 is a FireWire driver and jack 108 is a FireWire jack, parallel communications, where I/O interface 106 is a parallel port driver and jack 108 is a parallel port, or serial communications, where I/O interface is a serial driver and jack 108 is a serial port. Scan head 102 is pulled along stabilizer bar 112 often using a stepper motor. The orientation of the stabilizer bar determines the direction of scan. Flexible cable 110 is used to maintain communications between scan head 102 and electronic logic 104. Glass plate 114 forms a flat bed upon which document 120 is placed during the scan.

Electronic logic 104 serves several functions. Among these include controlling the motor to maintain an even scan velocity, receiving raw scanned data and processing the data into an image. In some scanners, electronic logic 104 can perform some image processing functions such as descreening and interpolation. As scanners get more sophisticated, more functions are incorporated into electronic logic 104 such as the ability to store scanned images on board. In addition, electronic logic 104 performs the defringing operations described below.

Scan head 102 can be implemented using one of several technologies. One technology employs lenses and charge coupled devices (CCD). Lenses split an image which is formed when document 120 is illuminated by a lamp into three versions of the original, each version passes through color filters to isolate the red, blue and green color components onto a CCD array. The paths of the light from the lamp to the document and from the document to the CCD array are often assisted by a collection of mirrors. Electronics in scan head 102 or electronic logic 104 combine the raw scanned data into a full color image.

The use of contact image sensors (CIS) has become increasingly more popular due to the lower cost. A scan head using this technology eliminates the CCD array, filters, lamp, and lenses. Instead, a row of CISs span the width of the scan area and are placed very close to the glass plate. During the scan the document is illuminated by a row of red, green, and blue light emitting diodes (LED) and the image is captured by the row of CISs.

Figure 2:
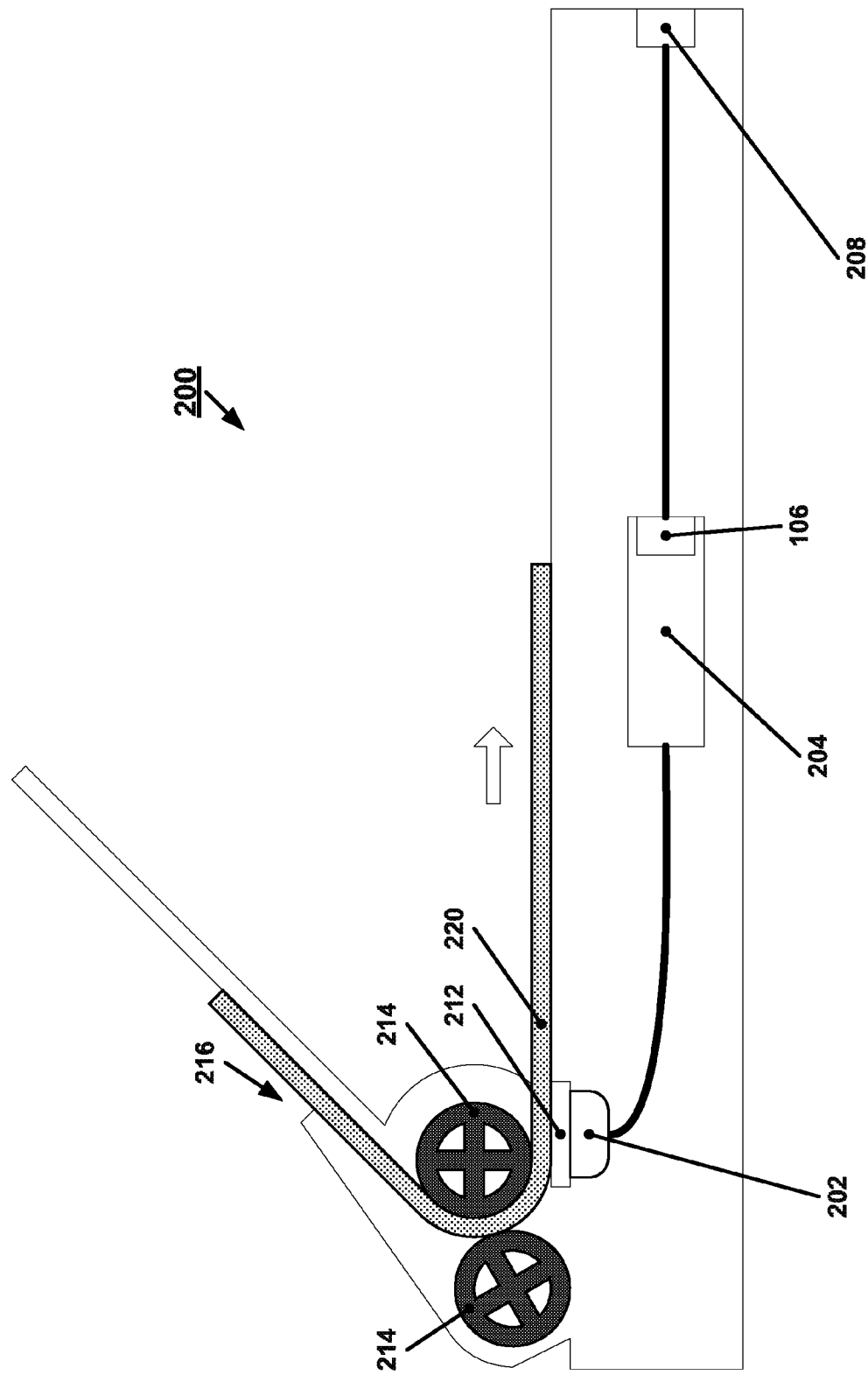
FIG. 2 shows an embodiment of a sheet feed scanner.

FIG. 2 shows an embodiment of a sheet feed scanner. Scanner 200 comprises scan head 202, electronic logic 204, jack 208, and sheet feed rollers 214. Optionally, scanner 200 comprises glass window 212. Document 220 is fed into sheet feed slot 216. During the scan, rollers 214 feed the document through the sheet feed slot. As document 220 passes over scan head 202, it may optionally pass over glass window 212 between document 220 and scan head 202. The process continues until the entire document is scanned.

Scan head 202 is similar to scan head 102 described for flatbed scanner 100. In fact, many multifunction peripherals are designed to function both as a flatbed scanner and a sheet feed scanner in which case, the same scan head is often used for both. Electronic logic 204 is similar to electronic logic 104 in that it comprises I/O interface 106 as described above. However, rather than controlling a stepper motor to move the scan head, electronic logic 204 controls sheet feed rollers 214 to control the scan. Electronic logic 204 can perform many of the same functions as described for electronic logic 104 including providing defringing filtering.

Fundamentally, the scan process is the same except in a flatbed scanner, the scan head moves relative to a stationary document and in a sheet feed scanner, the document moves relative to a stationary scan head.

Figure 3:
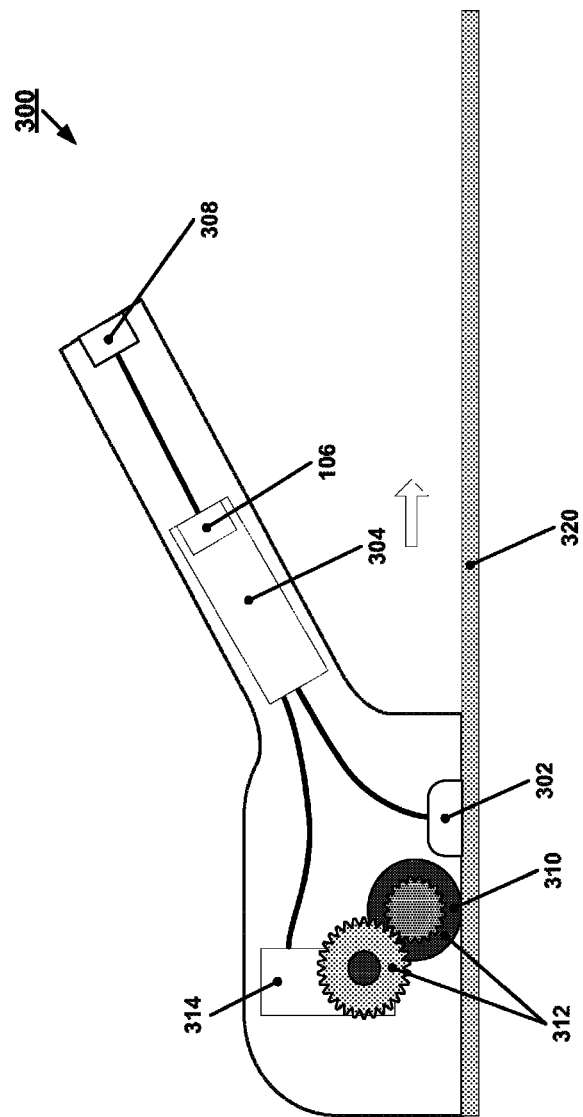
FIG. 3 shows an embodiment of a handheld scanner.

FIG. 3 shows an embodiment of a handheld scanner. Scanner 300 comprises scan head 302, electronic logic 304, jack 308, roller 310 and movement measurement device 314. Optionally, some sort of transmission means is used to mechanically transmit the rotational information of roller 310 to movement measurement device 314. The transmission means are shown as gears 312 in this diagram, but can be implemented with rollers and/or belts. During a scan, scanner 300 is manually dragged across document 320. Scan head 302 scans document 320 row by row. Roller 310 and movement measurement device 314 determine the scan velocity. Electronic logic 304 among other functions, reconstructs a full image based on the scan information received from scan head 302 and scan velocity information received from movement measurement device 314. Scan head 302 is similar to scan head 102 and can be implemented in a variety of technologies including with CCDs or CIS. Electronic logic 304 can perform many of the same functions as described for electronic logic 104 including providing defringing filtering.

Although described as a jack, jack 308 can more generally be described as either a jack for receiving an external cable or an internal connection to a permanently attached cable. Often in a handheld scanner, rather than providing a jack, a cable with a plug is offered, where the plug is of a specific interface type, e.g., USB, FireWire, serial or parallel. In some implementation, the jack is completely replaced by a wireless interface.

Figure 4:
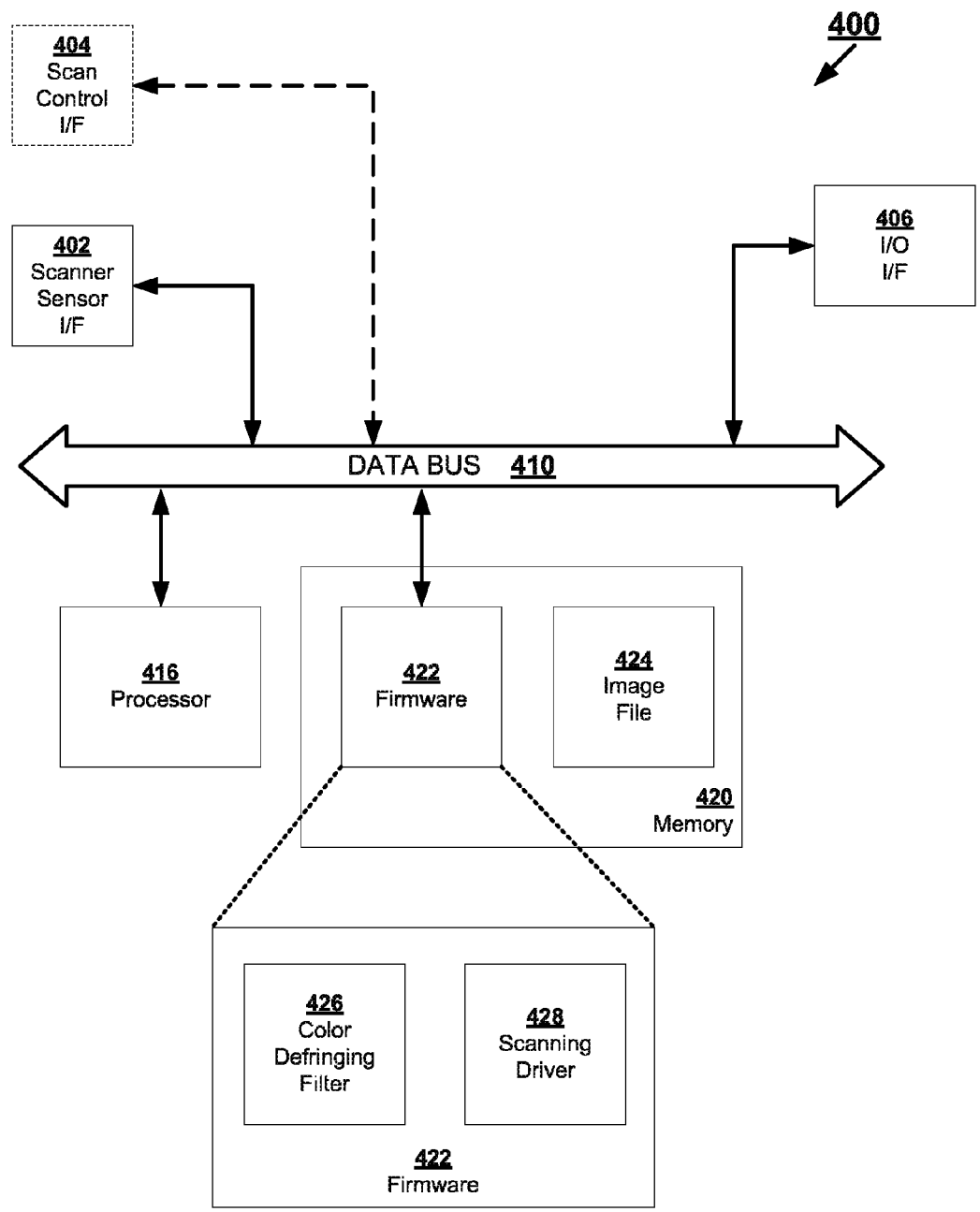
FIG. 4 is a diagram illustrating an embodiment of electronic logic that can be used in a flatbed, sheet fed or handheld scanner.

The electronic logic describe above for scanners 100, 200 and 300 can be implemented with discrete logic. However, as scanners and multifunction peripherals increase in complexity. They have adopted a processor architecture. FIG. 4 is a diagram illustrating an embodiment of the electronic logic that can be used in a flatbed, sheet fed or handheld scanner. For instance, electronic logic 400 can comprise memory 420, processor 416, interface 402 to the scanner sensor in the scan head, interface 404 to scan control circuitry, at least one interface 406 to the scanner I/O such as a serial port, parallel port, USB interface and/or FireWire interface, wherein each of these devices is connected across one or more data buses 310.

Interface 402 receives raw scan data from the sensors in the scan head. This data is typically color and intensity information obtained by scanning a document. Interface 404 is used to control the scan or receive scan related data such as scan velocity. For example, in a flatbed scanner, the interface is used to control a stepper motor and related circuitry in order to move the scan head. In another example, in a sheet fed scanner, the interface is used to control the rollers and related circuitry in order to move the document across the scan head. In another example, in a hand held scanner, the interface is used to receive scan velocity measurements from a movement measurement device.

Processor 416 can include any custom made or commercially available processor, a central processing unit (CPU) or an auxiliary processor among several processors associated with the scanner, a semiconductor based microprocessor (in the form of a microchip), a macroprocessor, one or more application specific integrated circuits (ASICs), a plurality of suitably configured digital logic gates, or generally any device for executing instructions.

Memory 420 can include any one of a combination of volatile memory elements (e.g., random-access memory (RAM), such as DRAM, and SRAM, etc.) and nonvolatile memory elements (e.g., flash, read only memory (ROM), nonvolatile RAM, etc.). Memory 420 comprises firmware 422 which may include one or more separate programs, each of which includes an ordered listing of executable instructions for implementing logical functions. Specifically, firmware 422 can comprise instructions for performing many of the functions described above including scanning driver 428 for controlling the scan and color defringing filter 426 which is described below. Also, firmware 422 can further include instructions for performing image processing operations such as descreening and interpolation. In some embodiments, memory 420 can also be used to store scanned images (e.g., image data 424). It should be noted, however, that the logic for performing these processes can also be implemented in hardware or a combination of software and hardware.

Figure 5:
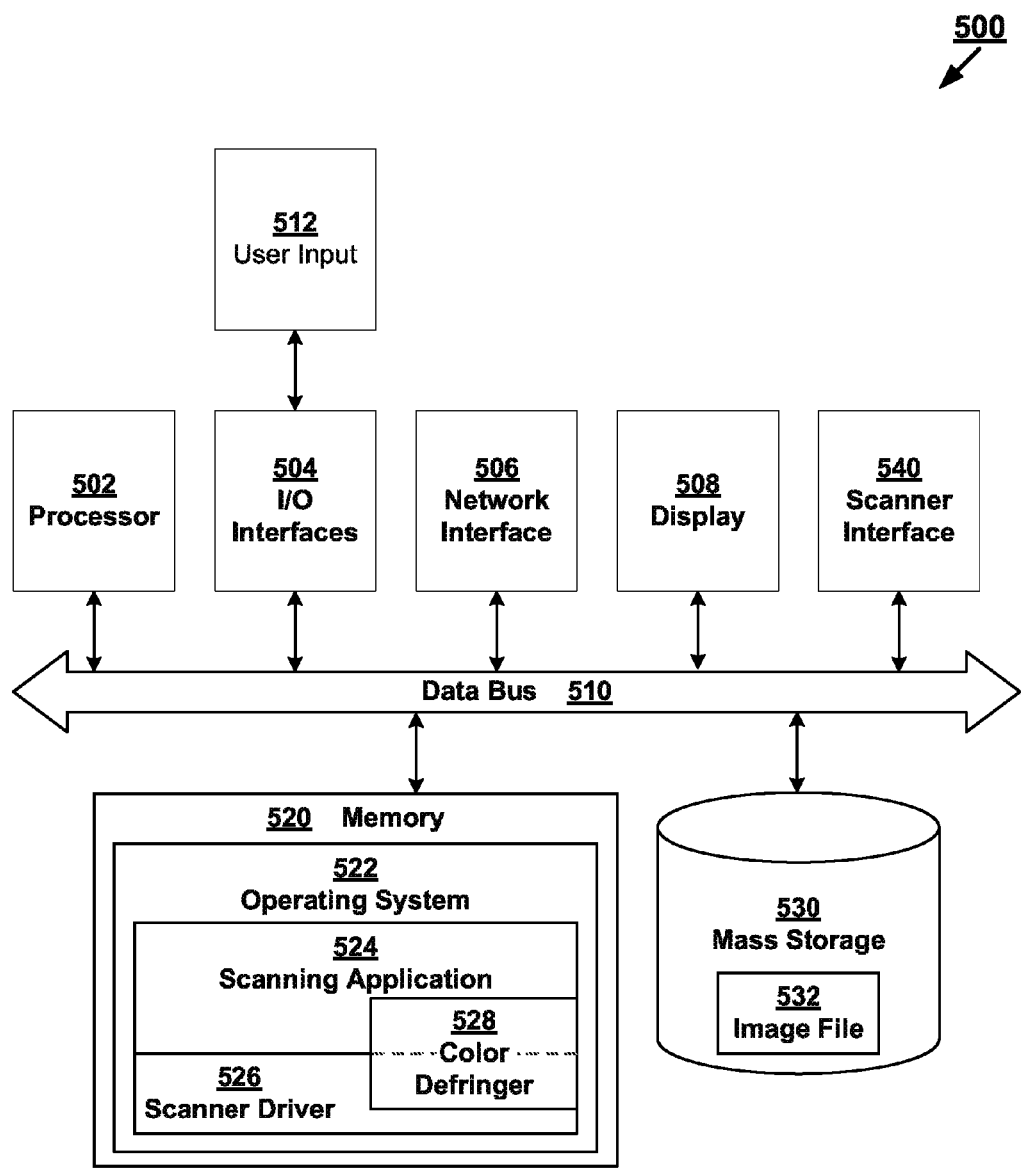
FIG. 5 illustrates an embodiment of a PC equipped with a color defringing filter.

In another embodiment, scanner electronics are not available for modification, for example, in a legacy scanner, so the defringing filter is implemented in software aboard a personal computer (PC) which is interfaced to a scanner. FIG. 5 illustrates an embodiment of a PC equipped with a color defringing filter. Generally speaking, PC 500 can comprise any one of a wide variety of computing devices, such as a desktop computer, portable computer, dedicated server computer, multiprocessor computing device, cellular telephone, PDA, handheld or pen based computer, embedded appliance and so forth. Regardless of its specific arrangement, PC 500 can, for instance, comprise memory 520, processor 502, a number of input/output interfaces 504, and mass storage 530, interface 540 for communicating with a scanner, wherein each of these devices is connected across one or more data buses 510.

Optionally, PC 500 can also comprise network interface device 506 and display 508, also connected across one or more data buses 510.

Like in the scanner, processing device 502 can include any custom made or commercially available processor, a CPU or an auxiliary processor among several processors associated with PC 500, a semiconductor based microprocessor (in the form of a microchip), a macroprocessor, one or more ASICs, a plurality of suitably configured digital logic gates, or generally any device for executing instructions.

Input/output interfaces 504 provide any number of interfaces for the input and output of data. For example, these components may interface with user input device 512, which may be a keyboard or a mouse. In other examples especially a handheld device (e.g., PDA, mobile telephone), these components may interface with function keys buttons, a touch sensitive screen, a stylus, etc. Display 508 can comprise a computer monitor or a plasma screen for a PC or a liquid crystal display (LCD) on a hand held device, for example.

Network interface device 506 comprises various components used to transmit and/or receive data over a network environment. By way of example, these may include a device that can communicate with both inputs and outputs, for instance, a modulator/demodulator (e.g., a modem), wireless (e.g., radio frequency (RF)) transceiver, a telephonic interface, a bridge, a router, a network card, etc.

Memory 520 can include any one of a combination of volatile memory elements and nonvolatile memory elements. Mass storage 530 can also include nonvolatile memory elements (e.g., flash, hard drive, tape, rewritable compact disc (CD-RW), etc.). Memory 520 comprises software which may include one or more separate programs, each of which includes an ordered listing of executable instructions for implementing logical functions. Often, the executable code can be loaded from nonvolatile memory elements including from components of memory 520 and mass storage 530. Specifically, the software can include native operating system 522, one or more native applications, emulation systems, or emulated applications for any of a variety of operating systems and/or emulated hardware platforms, emulated operating systems, etc. These may further include scanning application 524 which may be either a stand-alone application or a plug-in such as the TWAIN plugin to an application such as Photoshop® by Adobe®. These may further include scanner driver 526 which is used by applications to communicate with an external scanner. Scanner driver 526 can further comprise color defringing filter 528 as described in more detail below so as images are scanned, scanner driver 526 defringes image data before the application receives it. Alternatively, scanning application 524 comprises color defringing filter 528 so after scanning application 524 receives a complete scanned image, a defringing operation can be performed on the image. It should be noted, however, that the logic for performing these processes can also be implemented in hardware or a combination of software and hardware.

Mass storage 530 can be formatted into one of a number of file systems which divide the storage medium into files. These files can include image files 532 which can hold images that have been scanned. The images can be stored in a wide variety of file formats including but not limited to joint photographic exchange group (JPEG), graphics interface format (GIF), and tagged image file format (TIFF).

Interface 540 can be any number of interfaces matching the interface of the scanner. As previously described, these interfaces can be USB, FireWire, serial or parallel.

It should be noted that in this disclosure, three coefficient filters are used as the primary examples. Notationally, the expression [a b c] is used to described the following filter y(n,m)=ax(n,m+1)+bx(n,m)+cx(n,m−1), where x is the input to the filter and y is the output and m represents samples in the direction of scan. In other examples in this disclosure a five coefficient filter are used. In this case, the expression [a b c d e] is used to described the following filter y(n,m)=ax(n,m+2)+bx(n, m+1)+cx(n,m)+dx(n,m−1)+ex(n,m−2).

As mentioned, prior attempts to implement a color defringing filter to correct lateral chromatic aberrations have used interpolation to "shift" the color planes back into alignment. In a typical scenario, the red scan leads the green scan, which in turn leads the blue scan. For example, the red scan may lead the green scan by a ⅓ line. The green scan may in turn lead the blue scan by a ⅓ line. In order to shift, each color back into alignment, a shift filter can be applied to each color. For example, to correct for a ⅓ line shift, red filter 202 could shift filter implemented would be $$y_r(n, m) = \frac{1}{3}x_r(n, m+1) + \frac{2}{3}x_r(n, m),$$

equivalently expressed as $$\left[\begin{array}{ccc} \frac{1}{3} & \frac{2}{3} & 0 \end{array}\right],$$

where $x_r$ is the red component of the input image x and $y_r$ is the red component of the filtered image y. The green color plane can be left intact which can be expressed as [0 1 0], and a blue shift filter could correct for the ⅓ line shift, by $$y_b(n, m) = \frac{2}{3}x_b(n, m) + \frac{1}{3}x_b(n, m-1),$$

equivalently expressed as $$\left[\begin{array}{ccc} 0 & \frac{2}{3} & \frac{1}{3} \end{array}\right],$$

where $x_b$ is the blue component of the input image x and $y_b$ is the blue component of the filtered image y.

This only corrects for lateral chromatic aberration. An additional source of chromatic aberration, is due to colors having a different point spread function. In a scanner, the point spread function for a given color is essentially the impulse response of the scanning apparatus, that is, when a point is scanned the resultant image is its point spread function. This often can be an Airy disk, which is typically the impulse response of a circular aperture. The net effect is that a dot scanned in each color will spread into different size spots. It should be noted that while an Airy disk is infinite in extent, the size of an Airy disk refers the size of the first central lobe.

Figure 6:
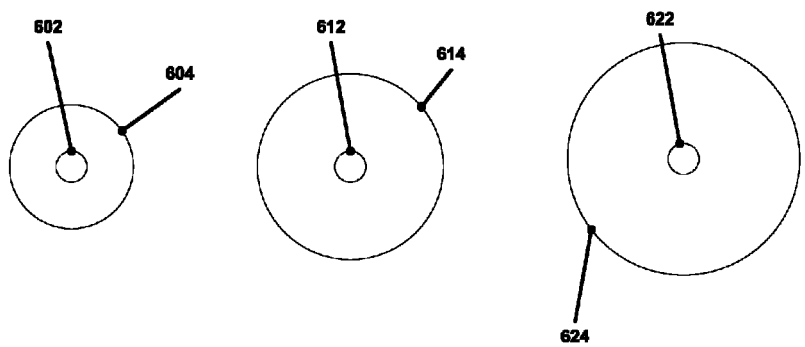
FIG. 6 demonstrates the chromatic aberration from varying point spread functions.

FIG. 6 demonstrates the chromatic aberration due to different point spread functions, dots 602, 612 and 622 are the same size, but when scanned by a scanner the resultant spots are different size. Typically blue spot 604 is the smallest, with green spot 614 the next smallest and red spot 624 is the largest. It should be noted that the scale of the dots and their corresponding spots are exaggerated, for clarity. This introduces another source of chromatic aberration. If the example of a solid white line is taken and if there were no aberration due to scan direction, there would still be some red and green fringing because the red and green components tend to spread more than the blue.

Figure 7:
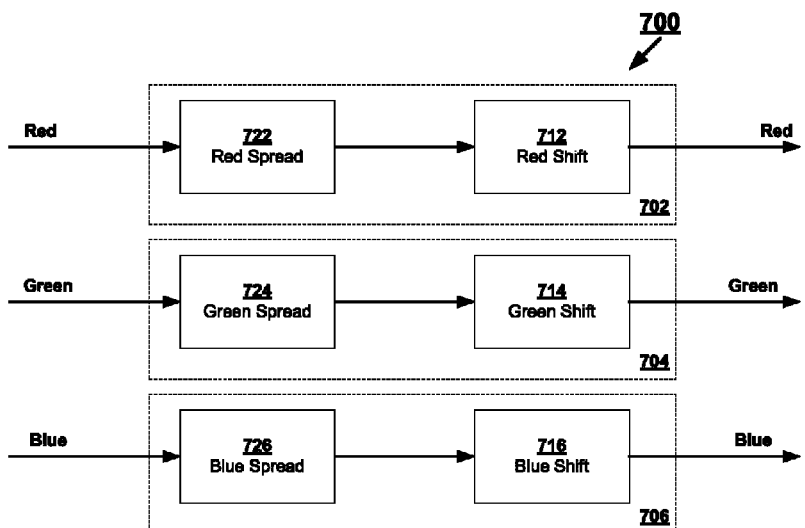
FIG. 7 shows an embodiment of a color defringing filter.

FIG. 7 shows an embodiment of a color defringing filter which takes the point spread function of each color into account. Defringing filter 700 comprises red filter 702 comprising red shift filter 712 and red spread filter 722, green filter 704 comprising green shift filter 714 and green spread filter 724 and blue filter 706 comprising blue shift filter 716 and blue spread filter 726. Red shift filter 712, green shift filter 714, and blue shift filter 716 perform shift by interpolation similar to that described above. For example, red shift filter 712 could be $$\begin{bmatrix} \frac{1}{3} & \frac{2}{3} & 0 \end{bmatrix},$$

green shift filter 714 could be [0 1 0], and a blue shift filter 716 could be $$\begin{bmatrix} 0 & \frac{2}{3} & \frac{1}{3} \end{bmatrix}.$$

It should be noted that while these ⅓ line shifts are used as an example, the actual shift used is selected based on the amount of chromatic aberration introduced by the scanner. For example, a scanner may only shift the red line by ¼ lines rather than ⅓.

Red spread filter 722, green spread filter 724 and blue spread filter 726 are used to adjust for the point spread function of each color. The three spread filters are used to "spread" or "contract" the point spread function of each color so their point spread functions have essentially the same width. It is not necessary to invert the point spread function of each color, but simply to apply a filter to each color so that their net point spread functions are approximately equal. As a result, if one color plane can be used as a reference one of the spread filters can be omitted as well as one of the shift filters. Generally speaking to "spread" the point spread response of a color with a narrow point spread function, a low-pass filter can be employed and to "contract" the point spread response of a color with a wide point spread function, a high-pass filter can be employed. Supposed in the example of FIG. 7, the green color plane is used as a reference. Then red spread filter 722 could be a high-pass filter and blue spread filter 726 could be a low-pass filter. However, because of the spreading effect of the low-pass filter inherent in the shift filters, it may be desirable to contract the point spread response of the colors using the color with the smallest point spread function as a reference or to contract the point spread responses of all the colors be contracted to a net point spread function, which is narrower than the smallest point spread function.

It should be noted that overall the discrepancy in the color spreading is typically less significant than the fringing caused by the scan alignment. Furthermore, due to the asymmetric nature of the optics in a typical contact image sensor, the point spread function may not actually be a circularly symmetric Airy disk, but have different spread in the direction of scan and perpendicular to the direction of scan. As a result, often the spread is also greater in the direction of scan. For this reason, one-dimensional filters in the direction of scan can be employed. However, the use of two-dimensional filters could mitigate fringing effect perpendicular to the direction of scan. As a result, improved two dimensional fringing can be traded for computational efficiency.

Figure 8:
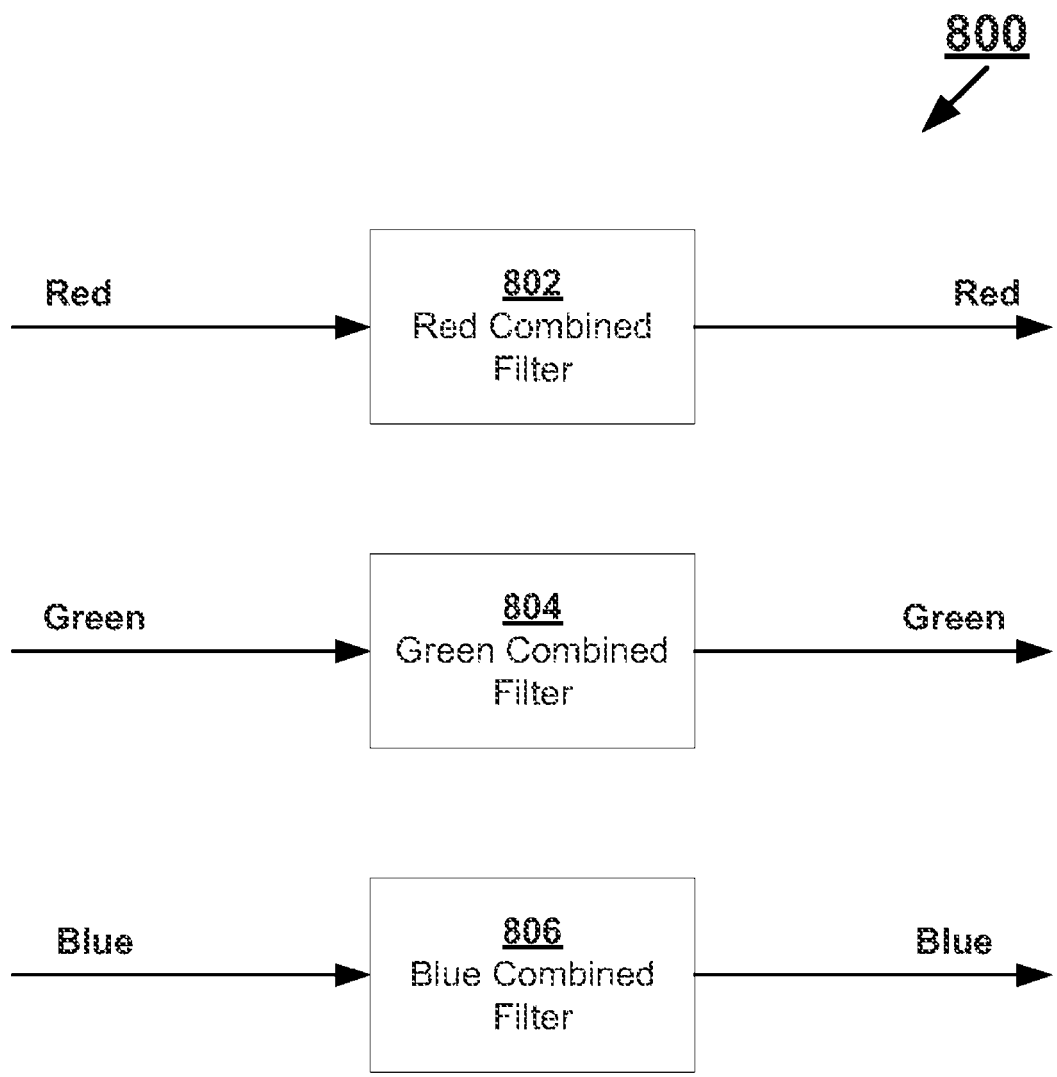
FIG. 8 shows an embodiment of a color defringing filter using combined filters.

Since all the filters in FIG. 7 are linear filters, filters for the same color can be combined. FIG. 8 shows an embodiment of a color defringing filter using combined filters. Defringing filter 800 comprises red combined filter 802, green combined filter 804 and blue combined filter 806. Red combined filter 802 is essentially red shift filter 712 combined with red spread filter 722. Similarly, green combined filter 804 is green shift filter 714 combined with green spread filter 724 and blue combined filter 806 is blue shift filter 716 combined with blue spread filter 726. Generally a combined filter is computationally more efficient than two discrete linear filters; further savings can also be obtained by truncating or approximating a combined filter. Furthermore both the shift factor and the spread factor can be taken into account when designing a filter.

For example, the red shift filter could have filter coefficients of [0.3 0.7 0]. A high-pass filter with coefficients [0.24- 0.34 1.2-0.34 0.24] can be used to correct for the spread factor. The resultant filter can be further simplified into a 3 coefficient filter by truncating higher order terms and then renormalizing. This results in a combined filter of [0.1 1.1 −0.2]. Likewise, the blue shift filter could have filter coefficients of [0 0.7 0.3]. A low-pass filter [0.22 0.56 0.22] can be applied to the blue color. The resultant blue combined filter after truncation and normalization is [0.2 0.3 0.5].

However, because shift filtering tends to accentuate the spreading of colors, it may be desirable not to use green as the reference. As an example, it has been observed that using a defringing filter with a "narrowed" green color plane as a reference (i.e., a green combined filter with filter coefficients [−0.1 1.2 −0.1] rather than a unity green combined filter with filter coefficients [0 1 0]) shows better visual results. The resultant red combined filter has filter coefficients of [0.5157 0.8467 −0.3514] and the resultant blue combined filter has filter coefficients of [−0.1321 0.6775 0.4546]. Of course these filter coefficients and even the amount of fringing can vary greatly from scanner to scanner and particularly from one scanner model to another.

Figure 9:
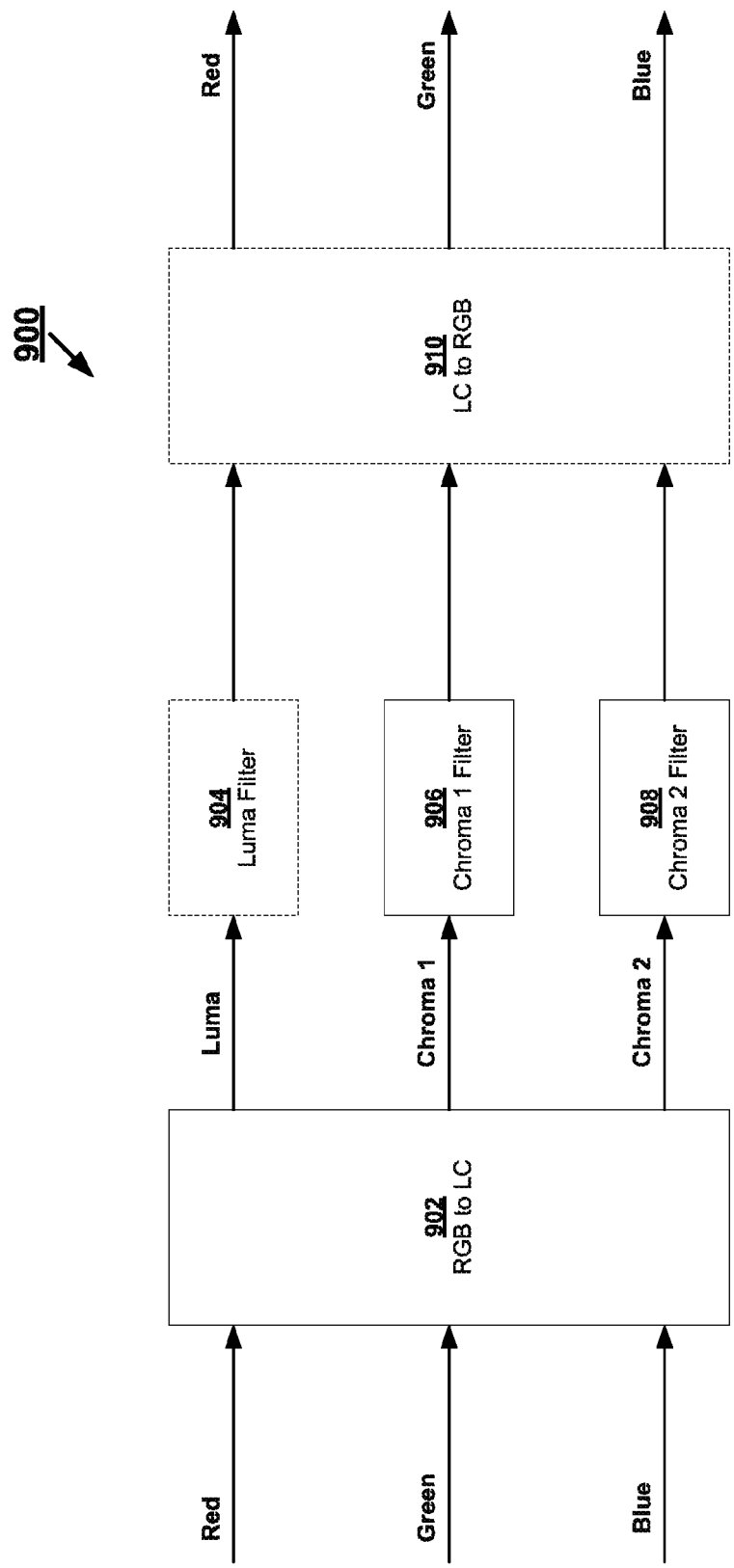
FIG. 9 shows an alternate embodiment of a color defringing filter.

FIG. 9 shows an alternate embodiment of a color defringing filter where defringing operations are carried out in a LC space. Generally speaking, there a number of models from LC space such as YUV, $YC_bC_r$, YIQ and $YP_bP_r$. However, in the art these definitions are sometimes confusing or conflicting definitions. For the purposes here a generic LC space is described where any luminance/chrominance model can be employed. An LC space comprises a luma component and two chroma components. The luma component essentially is the underlying grayscale image of a color image, where as the chroma components add the color to an image. In defringing filter 900, the image is converted to the LC space by RGB to LC converter 902, which can be a typical linear transformation of the red, green and blue color components into a luma, chroma 1 and chroma 2 components. For a classic RGB to YUV conversion, the following linear transformation is often used:

$$\begin{bmatrix} y \\ u \\ v \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} r \\ g \\ b \end{bmatrix}.$$

Chroma filter 906 and chroma filter 908 are used to suppress chromatic aberrations in the chroma 1 and chroma 2 components. For example, a low-pass filter can be used. Optionally, defringing filter 900 can comprise luma filter 904 which can be used to accentuate edges. For example, an edge detection filter or high-pass filter can be used. Finally, defringing filter 900 can optionally comprise LC to RGB converter 910 which again is typically a linear transformation. For a classic YUV to RGB conversion, the following linear transformation is often used:

$$\begin{bmatrix} r \\ g \\ b \end{bmatrix} = \begin{bmatrix} 1 & 0 & 1.14 \\ 1 & -0.395 & -0.581 \\ 1 & 2.032 & 0 \end{bmatrix} \begin{bmatrix} y \\ u \\ v \end{bmatrix}.$$

The use of LC to RGB converter 910 depends on the end use of the image. For example, if the image is displayed on an RGB monitor then converter 910 is used, but if the image is stored as a Joint Photographic Experts Group (JPEG) image where encoding uses luminance/chrominance components then converter 910 is not needed.

In practice however, the number of coefficients needed to achieve the defringing performance compared to defringing filter 700 or defringing filter 800 is much higher making defringing filter 900 not computationally efficient. Primarily this is due to the fact that the aforementioned fringing factors are computationally separable in the RGB space and are not so in the LC space. However, the residual fringing resulting from defringing filter 800 or defringing filter 900 can be effectively addressed using an LC solution.

Figure 10:
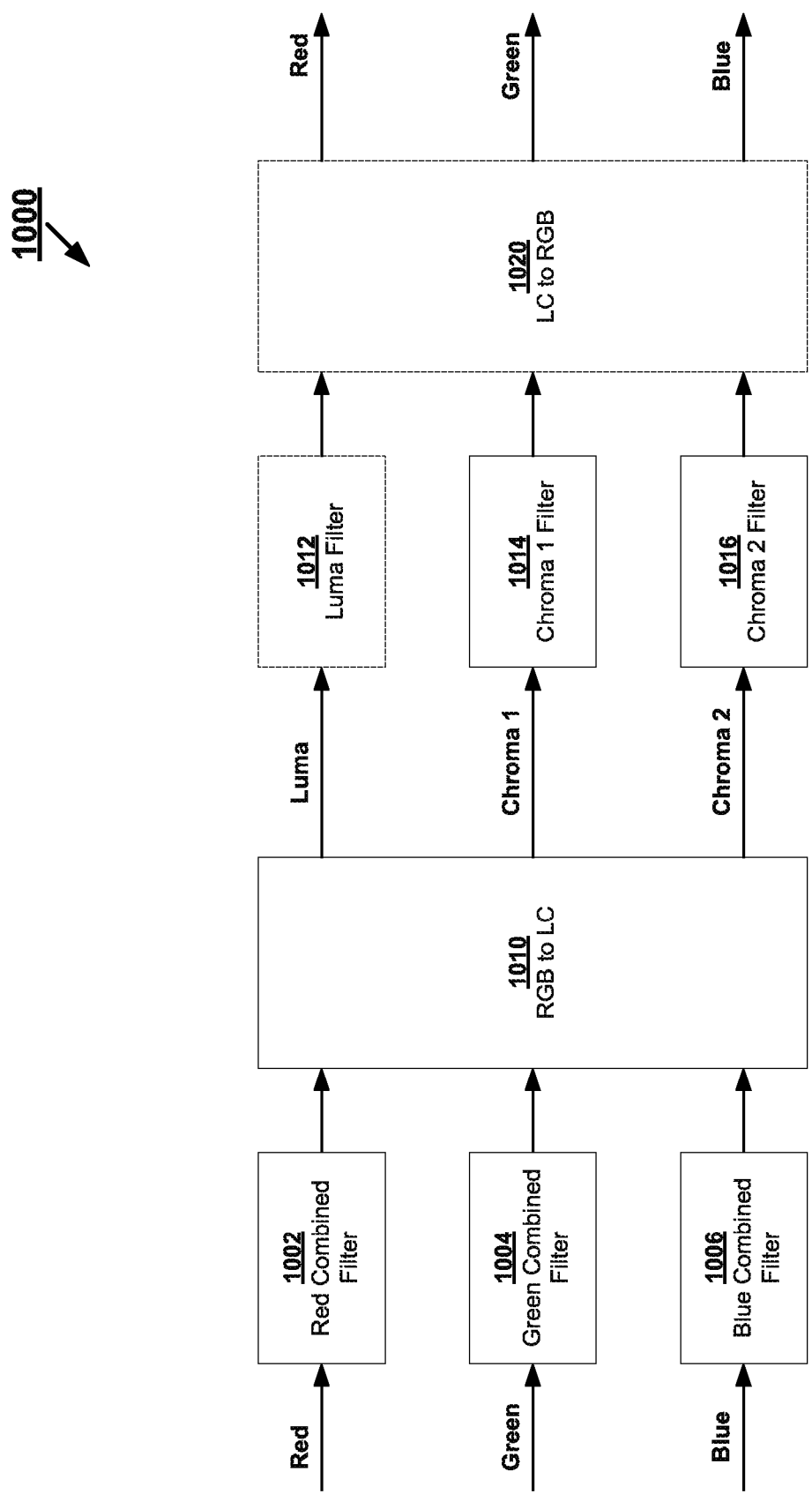
FIG. 10 shows yet another embodiment of a color defringing filter.

FIG. 10 shows another embodiment of a color defringing filter using filtering in the RGB color plane to correct lateral chromatic aberrations and LC processing to correct residual chromatic aberration. Defringing filter 1000 comprises red combined filter 1002, green combined filter 1004, and blue combined filter 1006 which individually may comprise a shift filter and a general color filter such as in defringing filter 700, a shift filter with a high or low-pass adjustment as described for defringing filter 800. Defringing filter further comprises RGB to LC converter 1010 which is as described for RGB to LC converter 902. Defringing filter 1000 comprises chroma filters 1014 and 1016 and optionally comprises luma filter 1012 which are analogous to chroma filters 906 and 908 and luma filter 904, respectively. Finally defringing filter 1000 can optionally comprise LC to RGB converter 1020 which is as described for LC to RGB converter 910. For defringing residual chromatic aberration, a simple 3-sample averaging low-pass filter $$\left(\text{i.e., a filter with filter coefficients } \begin{bmatrix} \frac{1}{3} & \frac{1}{3} & \frac{1}{3} \end{bmatrix}\right)$$

applied to the chroma components (e.g., chroma filters 1014 and 1016) has proven effective.

It should be noted that equivalently a unity filter that is a filter with a single non-zero coefficient, can be inserted in place one of the optional filters rather than removing the optional filter from the defringing filter.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A color defringing filter:
   a red filter;
   a blue filter;
   a green filter;
   an red-green-blue (RGB) to luminance/chrominance (LC) converter coupled to the red filter, the blue filter and the green filter;
   a first chroma filter and a second chroma filter coupled to the RGB to LC converter;
   wherein the first chroma filter filters a first chroma component of the image in a scan direction and the second chroma filter filters a second chroma component of the image;
   wherein filtering the red component comprises applying a red shift filter in accordance with $$y_r(n, m) = \frac{1}{3} x_r(n, m+1) + \frac{2}{3} x_r(n, m),$$

where $x_r$ is a red component of an input image and $y_r$ is a red component of a filtered image y, and filtering the blue component comprises applying a blue shift filter.

2. The filter of claim 1 wherein the red filter comprises a red shift filter shifting a red pixel component by ⅓ pixel and the blue filter comprises a blue shift filter shifting a blue pixel component by ⅓ pixel.

3. The filter of claim 1 wherein the red filter comprises a red spread filter, the blue filter comprises a blue spread filter and the green filter comprises a green spread filter.

4. The filter of claim 3 wherein the red spread filter comprises a high-pass filter, a low-pass filter, or a unity filter, the green spread filter comprises a high-pass filter, a low-pass filter or a unity filter, the blue spread filter comprises a high-pass filter, a low-pass filter or a unity filter.

5. The filter of claim 1 further comprising a luma filter operable to filter the luma component of an image.

6. The filter of claim 5 wherein the luma filter is a high-pass filter.

7. The filter of claim 1 further comprising a LC to RGB converter coupled to the first chroma filter and the second chroma filter.

8. The filter of claim 1 wherein the first chroma filter is a low-pass filter.

9. The filter of claim 1 wherein the second chroma filter is a low-pass filter.

10. A method of color defringing an image having a red component, a blue component and a green component, said method comprising:
    filtering the red component;
    filtering the blue component;
    filtering the green component; converting the red component, blue component, and green component into a luma component, a first chroma component and a second chroma component;
    filtering the first chroma component in a scan direction: and
    filtering the second chroma component in the scan direction, wherein filtering the red component comprises applying a red shift filter in accordance with $$y_r(n, m) = \frac{1}{3} x_r(n, m+1) + \frac{2}{3} x_r(n, m),$$

where $x_r$ is a red component of an input image and $y_r$ is a red component of a filtered image y, and filtering the blue component comprises applying a blue shift filter.

11. The method of claim 10 wherein filtering the red component comprises applying a red spread filter, filtering the blue component comprises applying a blue spread filter and filtering the green component comprises applying a green spread filter.

12. The method of claim 10, further comprising filtering the luma component.

13. The method of claim 12 wherein filtering the luma component comprises high-pass filtering.

14. The method of claim 10, further comprising converting the luma component, the first chroma component and second chroma component into RGB format.

15. The method of claim 10 wherein filtering the first chroma component comprises low-pass filtering.

16. The method of claim 10 wherein filtering the second chroma component comprises low-pass filtering.

17. A color defringing filter operable to defringe an image having a red component, a blue component, and a green component, said filter comprising:
means for filtering the red component;
means for filtering the blue component;
means for filtering the green component;
means for converting the red component, blue component, and green component into a luma component, a first chroma component and a second chroma component;
means for filtering the first chroma component; and
means far filtering the second chroma component;
wherein filtering the red component comprises applying a red shift filter in accordance with $$y_r(n, m) = \frac{1}{3} x_r(n, m+1) + \frac{2}{3} x_r(n, m),$$

where $x_r$ is a red component of an input image and $y_r$ is a red component of a filtered image y, and filtering the blue component comprises applying a blue shift filter.

18. The filter of claim 17 further comprising means for filtering the luma component.

19. The filter of claim 17 further comprising means for converting the luma component, the first chroma component and second chroma component into RGB format.

20. A scanner comprising:
a scan head;
electronic logic comprising an external interface, processor, and memory;
wherein the memory comprises instructions which causes the processor to defringe a scanned image having a red component, a blue component and a green component by filtering the red component by shifting a red pixel component in a scan direction by ⅓ pixel;
filtering the blue component by shifting a blue pixel component in the scan direction by ⅓ pixel;
converting the red component, blue component, and green component into a luma component, a first chroma component and a second chroma component;
filtering the first chroma component in the scan direction; and
filtering the second chroma component in the scan direction, wherein filtering the red component comprises applying a red shift filter in accordance with $$y_r(n, m) = \frac{1}{3} x_r(n, m+1) + \frac{2}{3} x_r(n, m),$$

where $x_r$ is a red component of an input image and $y_r$ is a red component of a filtered image y, and filtering the blue component comprises applying a blue shift filter.

21. The scanner of claim 20, wherein the instructions further cause the processor to defringe the scanned image by filtering the luma component.

22. The filter of claim 20 wherein the instructions further cause the processor to defringe the scanned image converting the luma component, the first chroma component and second chroma component into RGB format.

23. The scanner of claim 20, wherein the scanner is a flatbed scanner, a handheld scanner, a sheet feed scanner, or a multifunctional peripheral.

* * * * *

UNITED STATES PATENT AND TRADEMARK OFFICE
CERTIFICATE OF CORRECTION

PATENT NO. : 8,477,394 B2
APPLICATION NO. : 12/851343
DATED : July 2, 2013
INVENTOR(S) : Ragnar H. Jonsson, Derek T. Walton and Trausti Thormundsson It is certified that error appears in the above-identified patent and that said Letters Patent is hereby corrected as shown below:

In the Specifications:

Column 11, line 31, replace "far" with "for"

Signed and Sealed this
Twentieth Day of August, 2013

Teresa Stanek Rea
*Acting Director of the United States Patent and Trademark Office*